Jan. 27, 1959  C. H. YOUNGBERG ET AL  2,870,849
AUTOMATIC LUBRICATION FOR DISK HARROWS
Filed Sept. 12, 1956

CHARLES H. YOUNGBERG
WILLIAM P. OEHLER  *INVENTORS*

BY

*ATTORNEYS*

United States Patent Office 2,870,849
Patented Jan. 27, 1959

2,870,849

AUTOMATIC LUBRICATION FOR DISK HARROWS

Charles H. Youngberg and William P. Oehler, Moline, Ill., assignors, by mesne assignments, to Deere & Company, a corporation of Delaware Application September 12, 1956, Serial No. 609,491

8 Claims. (Cl. 172—413)

The present invention relates generally to agricultural implements and more particularly to implements including operating means having bearing means of the type that is adapted to be lubricated.

The object and general nature of the present invention is the provision of an implement of this kind having a movable part and means operated by movement of said part for automatically supplying lubricant to the bearing means whenever said part is operated, thereby providing for automatic lubrication of the implement bearing means whereby the latter may constantly be supplied with lubricant. More specifically, it is a feature of this invention to provide means mounting a lubricant-supplying unit on an agricultural implement so that the unit directs lubricant to the bearing means of the implement. Further, it is a feature of this invention to arrange the mounting so that the lubricant unit may be manually operated, independently of movement of the associated implement part.

These and other objects and advantages of the present invention will be apparent to those skilled in the art after a consideration of the following detailed description, taken in conjunction with the accompanying drawings, in which—

Figure 1:
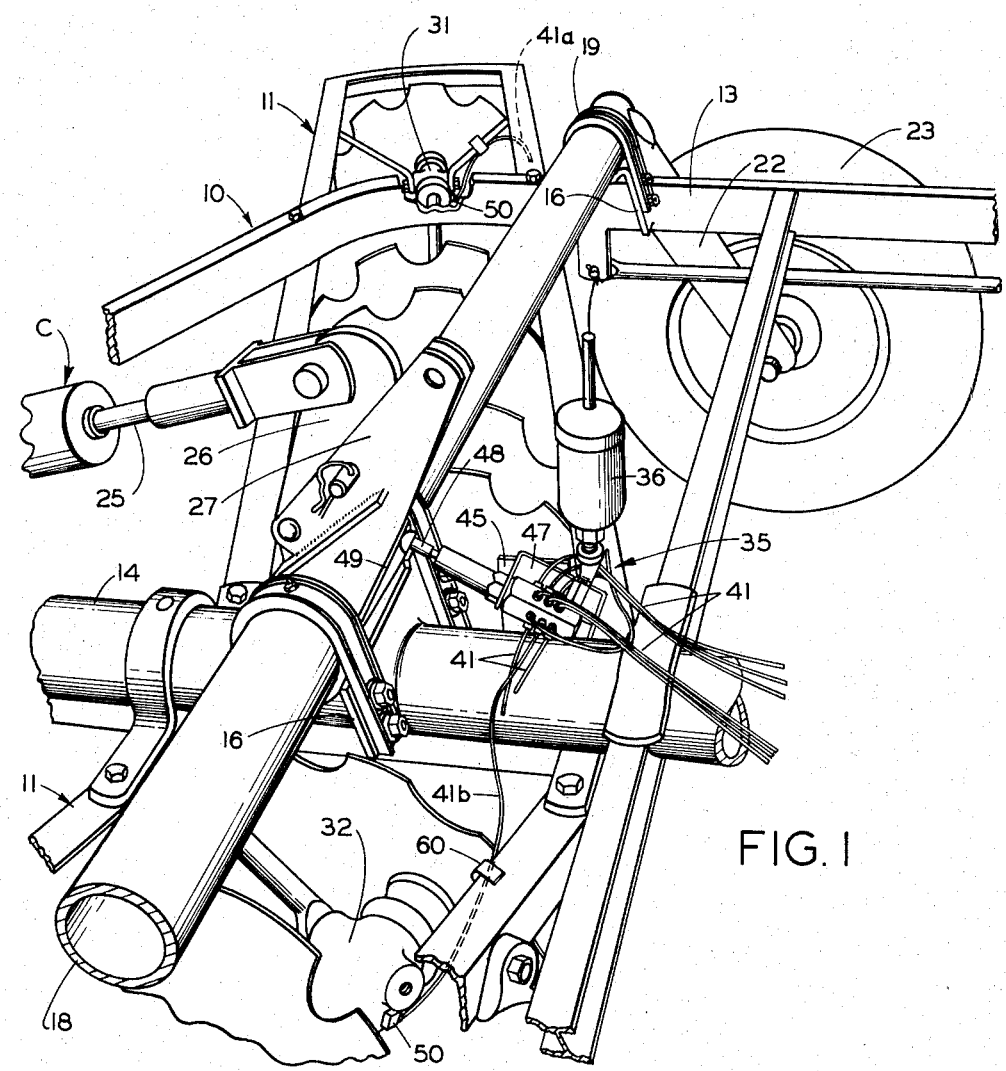
Figure 1 is a fragmentary perspective view of a disk harrow in which the principles of the present invention have been incorporated, the lubricant-supplying unit being operated by movement of the part that raises and lowers the implement between operating and transport positions.

The disk harrow shown in Figure 1 is a wheel-supported type implement and includes a main frame 10 carrying a pair of front disk gangs 11 and a similar pair of disk gangs (not shown) at the rear. The frame 10 includes side bars 13, the right hand bar only being shown, and a main central pipe member 14 that forms the principal portion of the main frame 10. The side bars 13 and the main pipe member 14 carry saddle type brackets 16 that rockably receive a transversely disposed pipe member 18 that forms the principal part of a wheel frame 19 that is rockably connected with and supports the main frame 10. The wheel frame 19 also includes generally downwardly and rearwardly extending wheel arms 22, only one of which is shown in Figure 1, and on the lower end of each arm 22 a ground wheel 23 is journaled. The front and rear disk gangs remain in a fixed angle and are raised and lowered into and out of transport and working positions by swinging the wheel frame 19 so as to force the ground wheels downwardly or move them upwardly relative to the main frame, thus raising or lowering the latter and the disk gangs. The wheel frame 19 is rocked by means of the power cylinder C, which normally forms a part of the tractor that propels the implement and the cylinder is connected by a piston rod 25 to a pair of interconnected arms 26 and 27, the latter of which is fixed rigidly to the wheel frame part member 18 so that when the cylinder C is extended or retracted, the arm 26 and the pipe member 18 are rocked between operating and transport positions. The wheel frame 19 is shown in a transport position in Figure 1, the wheel 23 being lowered and the frame and gangs 11 being raised out of their working position. Each of the disk gangs 11, and also each of the rear gangs, is provided with a pair of bearings. The outer bearing for the right hand unit 11 is shown at 31 and the inner bearing for the left hand unit is shown at 32. Each gang 11 includes, of course, an outer bearing and an inner bearing, and the same is true of the rear gangs.

Figure 2:
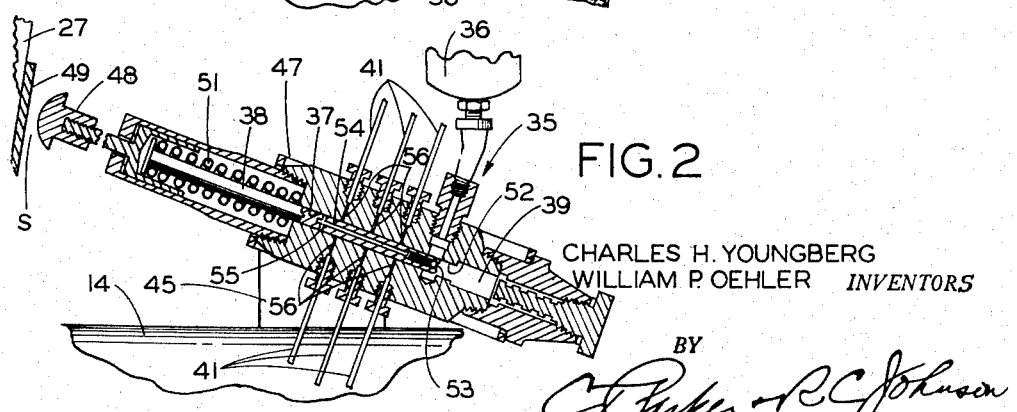
Figure 2 is an enlarged detailed view, partly in section, showing the principal features of the lubricant-supply unit and the relation between the latter and the operating part of the implement that controls the lubricant-supplying unit.

According to the principles of the present invention, we provide means for automatically lubricating the bearings 31 and 32 wherever the wheel frame 19 is actuated to raise the harrow into its transport position. To this end, we provide a lubricant supply unit, indicated in its entirety by the reference numeral 35. As best shown in Figure 2, the unit 35 includes lubricant reservoir 36, a plunger cylinder 37 having a plunger 38 movable therein, a measuring chamber 39 communicating with the cylinder 37 and a plurality of conduits or tubes 41 leading to various bearings adapted to receive lubricant from the unit 35.

The lubricant supplying unit 35 is not per se our invention, the same being available commercially on the open market but we believe ourselves to be the first to utilize a unit of this type in providing for automatic lubrication of the bearings of an agricultural implement.

In order to provide automatic lubrication in the disk harrow shown, we provide a mounting bracket 45 and secure the same to the main frame pipe member 14 at a point immediately to the rear of the arm 27 that is fixed to the wheel frame pipe member 18. The unit 35 includes an attaching yoke 47 that supports the plunger cylinder 37 and associated parts. As shown in Figure 1, the plunger extends generally forwardly and upwardly and at its upper end carries an abutment 48 that is disposed so as to be contacted by a plate 49 that forms a part of the associated arm 26. As also shown in Figure 1, there are as many as twelve tubes 41 leading from the cylinder 37, and one of these tubes, shown at 41a, leads to the outer bearing means at the right hand front gang. Another tube 41b leads to the inner bearing means of the left hand front gang, and the other tubes lead to other bearing means (not shown). Each of the tubes 41a and 41b at their outer ends is connected into a fitting 50 that is secured to the associated bearing means in any suitable way, as being screwed into the opening provided to receive a conventional lubricant fitting.

In operation, each time the wheel frame 19 is rocked to force the ground wheels downwardly and raise the implement into a transport position, the plate 49 engages the forward end of the plunger 38 and forces the latter generally rearwardly. Normally, the plunger is held in its extended position by means of a spring 51 that forms a part of the unit 35. From Figure 2 it will be seen that the innermost end of the plunger 38 is adapted to enter the measuring chamber 39 through an opening 52 therein in which the inner end of the plunger 38 fits snugly. The plunger 38 is hollow and the inner end is closed by a ball check 53. When the plunger 38 is forced into the measuring chamber 52, lubricant is forced past the ball check 53 and into the bore 54 in the plunger 38. Lubricant is moved from the bore 54 outwardly into a groove 55, and the latter communicates successively with transverse bores 56 to which the inner ends of the lubricant tubes 41 are respectfully connected. Thus, as can be seen from Figure 1, every time the implement is raised into a transport position, which normally occurs at each end of the field being worked, each bearing means successively receives a small quantity of lubricant. As can be seen from Figure 2, the measuring chamber 29 is recharged from the reservoir 36 each time the plunger 38 is moved to its extended position. This figure also shows that when the plunger is in its extended position, there is a space S between the outer ends of the plunger, particularly the abutment member 48 and the associated operating plate 49 on the arm 26. This space provides means for access to the outer end of the plunger so that the latter may be operated manually at any time desired. For example, in working large fields in which the implement is maintained in operating position over relatively long periods of time, the operator may desire to provide a supply of lubricant to the bearing means between such times as the implement is raised, and this can readily be done, according to the present invention, by manually operating the plunger 38 to direct lubricant to the several bearing means. Clips 60 may be used to hold the various lubricant tubes 41 in position on the frames or other parts of the implement so that in operation they are not displaced by vibration or torn loose from the associated fittings by any other means.

By directing a relatively small but periodically applied quantity of lubricant to the bearings, the latter are kept adequately lubricated at all times without the disadvantages of excessive lubrication at one time and inadequate supplies thereof at other times, as may frequently occur when manual greasing, as with grease guns or the like, is practiced.

While we have shown and described a preferred structure in which the principles of the present invention have been incorporated, it is to be understood that our invention is not to be limited to the particular means, shown and described above, but that, in fact, widely different means may be utilized in the practice of the broader aspects of our invention.

What we claim, therefore, and desire to secure by Letters Patent is:

1. In a disk harrow, a main frame, a disk gang having bearing means and carried by said frame, means to raise said frame and gang into a transport position, and means connected to be actuated by said raising means for forcing lubricant to said bearing means.

2. In a disk harrow, a main frame, a wheel frame rockably connected therewith, a disk gang carried by said main frame and including bearing means adapted to be lubricated, a lubricant delivering means carried by said main frame and connected with said bearing means, said lubricant delivering means including an operating plunger, and means mounting said lubricat delivering means on said main frame in a position such that said plunger is disposed in the path of movement of and operated by said rockable wheel frame.

3. In a disk harrow, a disk gang having bearing means, means including a movable part connected with said gang to shift the latter into and out of operating position, means connected with said bearing means to supply lubricant thereto, including a part movable to force lubricant to said bearing means, and means to connect said latter part to said first movable part, whereby lubricant is supplied to said bearing means when said gang is shifted.

4. In a disk harrow, a main frame, disk gang means connected therewith and including bearing means adapted to be lubricated, an operating part movable relative to the main frame, a lubricant supplying unit connected to direct lubricant to said bearing means and including an operating plunger movement of which serves to cause lubricant to flow toward said bearing means, and means on said frame mounting said unit in a position such that movement of said operating part engages and shifts said plunger.

5. In a disk harrow, a main frame, disk gang means connected therewith and including bearing means adapted to be lubricated, an operating part movable relative to the main frame between two positions, a lubricant supplying unit connected to direct lubricant to said bearing means and including an operating plunger movement of which between extended and retracted positions serves to cause lubricant to flow toward said bearing means, and means on said frame mounting said lubricant supplying unit in a position such that movement of said operating part through a portion only of its range of movement between said two positions acts against said plunger to cause the latter to direct lubricant to said bearing means, said operating part being movable away from said plunger in the extended position of the latter so as to provide space whereby said plunger may be operated manually, independently of movement of said operating part.

6. In an agricultural implement, a main frame, movable operating means carried thereby and including bearing means adapted to be lubricated, an operating part movable relative to the main frame, a lubricant supplying unit connected to direct lubricant to said bearing means and including an operating plunger movement of which serves to cause lubricant to flow toward said bearing means, and means on said frame mounting said unit in a position such that movement of said operating part engages and shifts said plunger.

7. The invention set forth in claim 6, further characterized by said mounting means disposing said lubricant supplying unit in such position that in one position of the operating part the latter is spaced from the outer end of said plunger, thereby providing access to the latter for operating the plunger manually independently of said operating part.

8. In an agricultural implement, a main frame, movable operating means carried thereby and including bearing means adapted to be lubricated, a wheel frame swingably connected with said main frame to raise and lower the latter, a lubricant supplying unit connected to direct lubricant to said bearing means and including an operating part, movement of which serves to cause lubricant to flow toward said bearing means, and means on said wheel frame disposed to engage and move said part for forcing lubricant to said bearing means.

References Cited in the file of this patent

UNITED STATES PATENTS

| | | |
|---|---|---|
| 1,987,256 | Johnson et al. | Jan. 8, 1935 |
| 2,003,014 | Siegrist | May 28, 1935 |
| 2,076,977 | Bush | Apr. 13, 1937 |
| 2,380,594 | Heckathron | July 31, 1945 |

FOREIGN PATENTS

| | | |
|---|---|---|
| 272,963 | Great Britain | Mar. 8, 1928 |